(12) United States Patent
Law et al.

(10) Patent No.: US 7,575,642 B2
(45) Date of Patent: Aug. 18, 2009

(54) PURGE SOLUTION

(75) Inventors: David Law, Livonia, MI (US); Gregory W Drewno, Riverview, MI (US); Robert Ball, Southfield, MI (US); Michael J Anchor, Canton, MI (US)

(73) Assignee: BASF Corporation, Wyandotte, MI (US)

( * ) Notice: Subject to any disclaimer, the term of this patent is extended or adjusted under 35 U.S.C. 154(b) by 0 days.

(21) Appl. No.: 12/023,746

(22) Filed: Jan. 31, 2008

(65) Prior Publication Data

US 2008/0210266 A1    Sep. 4, 2008

Related U.S. Application Data

(62) Division of application No. 11/061,239, filed on Feb. 18, 2005.

(60) Provisional application No. 60/546,307, filed on Feb. 20, 2004.

(51) Int. Cl.
*B08B 3/04* (2006.01)

(52) U.S. Cl. .................. 134/38; 134/22.1; 134/22.11; 134/22.13; 134/22.14; 134/22.17; 134/22.19; 134/42; 510/201; 510/202; 510/203

(58) Field of Classification Search .......... 134/36, 134/38, 42, 22.1, 22.11, 22.13, 22.14, 22.17, 134/22.19; 510/201–203
See application file for complete search history.

(56) References Cited

U.S. PATENT DOCUMENTS

| | | | | |
|---|---|---|---|---|
| 3,954,648 | A | * | 5/1976 | Belcak et al. ............ 510/212 |
| 4,619,711 | A | | 10/1986 | Olbrueck et al. |
| 5,011,621 | A | * | 4/1991 | Sullivan ................ 510/211 |
| 5,334,255 | A | * | 8/1994 | James et al. ............. 134/38 |
| 5,629,277 | A | | 5/1997 | Plishka |
| 5,849,682 | A | | 12/1998 | Van Eenam |
| 5,861,366 | A | | 1/1999 | Ihns et al. |
| 5,993,562 | A | * | 11/1999 | Roelofs et al. ............ 134/7 |
| 6,074,999 | A | * | 6/2000 | Iizuka et al. ............. 510/201 |
| 6,358,901 | B1 | | 3/2002 | Joye et al. |
| 6,423,677 | B1 | | 7/2002 | Van Eenam |
| 6,844,309 | B1 | | 1/2005 | Sivik et al. |
| 2002/0058600 | A1 | | 5/2002 | Van Eenam |
| 2002/0144718 | A1 | * | 10/2002 | Wilson .................. 134/38 |
| 2003/0153477 | A1 | | 8/2003 | Fedrigo et al. |
| 2005/0164902 | A1 | | 7/2005 | Man et al. |
| 2005/0183631 | A1 | * | 8/2005 | Law et al. ............... 106/38 |

\* cited by examiner

*Primary Examiner*—Sharidan Carrillo
(74) *Attorney, Agent, or Firm*—Harness, Dickey & Pierce, P.L.C.

(57) ABSTRACT

A composition comprising a polypropylene glycol, a polyethylene glycol ester, an amine, and optionally an alcohol. The composition can be used as a purge solution to clean paint equipment.

4 Claims, No Drawings

PURGE SOLUTION

CROSS-REFERENCE TO RELATED APPLICATIONS

This application is a divisional of U.S. patent application Ser. No. 11/061,239 filed on Feb. 18, 2005, which claims the benefit of U.S. Provisional Application No. 60/546,307 filed Feb. 20, 2004, which are hereby incorporated by reference in their entireties.

BACKGROUND OF THE INVENTION

Paint equipment from time to time will need to be cleaned. The equipment will need cleaned when there is a build up coating material on the paint equipment or when switching between coating materials.

Purge solutions can be used to clean paint equipment. When using purge solutions, it is desired to minimize the volatile organic content (VOC) of the purge solution to minimize the amount of organic emissions.

One type of paint equipment is a high-speed rotary atomizer. Paint is supplied through a bell cup. As the paint supply is triggered on and off, paint can dry on the bell. A purge cycle is used to clean the bell by supplying alternating amounts of purge solution and air through the atomizer. Materials that are hard to clean require purge solutions with higher concentration of solvents or large volumes of purge solution to clean the material. This can result in increased VOC emissions.

SUMMARY OF THE INVENTION

A composition comprising a polypropylene glycol, a polyethylene glycol ester, an amine, and optionally an alcohol.

DETAILED DESCRIPTION

As used throughout, ranges are used as a shorthand for describing each and every value that is within the range. Any value within the range can be selected as the terminus of the range. "A" and "an" as used herein indicate "at least one" of the item is present; a plurality of such items may be present, when possible. "About" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates a possible variation of up to 5% in the value.

The present invention relates to a composition that can be used as a purge solution. The composition includes a polypropylene glycol, a polyethylene glycol ester, an amine, and optionally an alcohol. Preferably, the alcohol is present in the composition.

In a preferred embodiment, the composition has VOC content of 2 lb/gal or less. Preferably, it has a VOC content of 1 lb/gal or less.

The composition includes, based on weight, from about 40 to about 80 weight % polypropylene glycol, from about 20 to about 60 weight % polyethylene glycol ester, from about 1 to about 10 weight % amine, and from 0 to about 30 weight % alcohol. The composition may alternatively include, based on weight, from about 45 to about 65 weight % polypropylene glycol, from about 18 to about 32 weight % polyethylene glycol ester, from about 2 to about 8 weight % amine and from about 10% to about 30 weight % alcohol.

The polypropylene glycol can be any polypropylene glycol. Preferably, the polypropylene glycol has a number average molecular weight of from about 600 to about 1200. A preferred polypropylene glycol is available from BASF Corporation as PLURACOL® P1010 (CAS No. 25322-69-4), which has a number average molecular weight of about 1000.

The polyethylene glycol ester is a mono or diester of a fatty acid or oil reacted with a polyethylene glycol. Preferably, the polyethylene glycol ester has a number average molecular weight from about 200 to 1450. A preferred polyethylene glycol ester is available from BASF Corporation as MAPEG® 400 MOT (CAS No. 61791-00-2), which has a number average molecular weight of about 400.

The amine can be any amine. Examples of the amine include, but are not limited to, dimethylethanol amine, ethanolamine, propanolamine, 3-amino-1-propanol, methylethanolamine 2-amino-2methyl-1-propanol, and 2-amino-1-butanol. Preferably, the amine is dimethylethanol amine (DMEA).

Optionally, an alcohol can be included in the composition. The alcohol can be any alcohol. Preferably, the alcohol is an aliphatic monohydric alcohol. Preferably, the aliphatic monohydric alcohol is water soluble and contains 1 to 5 carbon atoms. A preferred alcohol is n-butanol. In a preferred embodiment, the amount of the alcohol can be up to 40% by weight of the composition. It is preferred to minimize the amount of alcohol in order to minimize VOC. In a preferred embodiment, the alcohol is present at 20% by weight of the composition. In another embodiment, no alcohol is present in the composition.

The composition can be used as a purge solution. The composition as provided is generally diluted to a desired concentration with a solvent. The solvent can be any solvent that can solubilize the composition. Preferably, the solvent does not contribute to VOC. In a preferred embodiment, the solvent is water. Preferably, the composition is diluted to 10 to 30 weight % based on the weight of the composition in the solvent.

The diluted composition is applied to paint equipment to clean the equipment.

The composition can be supplied as a concentrate, and it can be diluted at the paint equipment site. The composition produces little or no foam when the composition is circulated through equipment. Also, when agitated, the composition forms a stable dispersion.

SPECIFIC EMBODIMENTS OF THE INVENTION

The invention is further described in the following examples. The examples are merely illustrative and do not in any way limit the scope of the invention as described and claimed.

Example 1

The following composition was prepared.

| Material | Trade Name | CAS # | Weight % in composition |
|---|---|---|---|
| polypropylene glycol | PLURACOL® P1010 from BASF | 25322-69-4 | 61% |
| polyethylene glycol ester | MAYPEG® 400 MOT from BASF | 61791-00-2 | 34% |
| dimethylethanol amine | | 108-01-0 | 5% |

The composition has a VOC content of 0.67 lb./gal.

The composition was diluted to a 10% by weight solution and a 20% by weight solution of the composition in water.

Test panels were prepared by applying a non-ionic polyurethane dispersion (available from BASF as E54 waterborne basecoat) to a 4"×6" glass plate to form a 4 mil wet film using a 3" drawdown bar. The plate was flashed for 30 minutes at 120° F. The film was placed at a 15° angle. Using a pipet, 60 drops of dilute solution were dripped onto the film for one minute. The area of contact was then rated for dissolving and/or lifting. Additionally, a control was prepared using PARCASOL® 277 solution from Henkel. Both the 10% and 20% solutions showed more dissolving and/or lifting than the control.

Example 2

The following composition was prepared.

| Material | Trade Name | CAS # | Weight % in composition |
| --- | --- | --- | --- |
| polypropylene glycol | PLURACOL ® P1010 from BASF | 25322-69-4 | 51.2 |
| polyethylene glycol ester | MAYPEG ® 400 MOT from BASF | 61791-00-2 | 24.8 |
| dimethylethanol amine | | 108-01-0 | 4 |
| n-butanol | | 71-36-3 | 20 |

The composition has a VOC content of 2 lb./gal.

The composition was diluted to a 15% by weight solution of the composition in water.

Test panels were prepared as in Example 1. The solution showed more dissolving and/or lifting than the control.

It should be appreciated that the present invention is not limited to the specific embodiments described above, but includes variations, modifications and equivalent embodiments defined by the following claims.

What is claimed is:

1. A method of cleaning paint equipment comprising:
   applying to paint equipment a composition comprising a polypropylene glycol, a polyethylene glycol ester, water, optionally an alcohol, and an amine from about 1 to about 10 weight percent, based on total weight of all components of the composition except for water, wherein the polyethylene glycol ester is a mono or diester of a fatty acid reacted with a polyethylene glycol and the amine is a member selected from the group consisting of dimethylethanol amine, ethanolamine, propanolamine, 3-amino-1-propanol, methylethanolamine, 2-amino-2-methyl-1-propanol, 2-amino-1-butanol, and combinations thereof; and
   wherein said applying comprises circulating the composition in the paint equipment.

2. A method according to claim 1, wherein, based on total weight of all components of the composition except for water, the polypropylene glycol is from about 40 to about 80 weight percent and the polyethylene glycol ester is from about 20 to about 60 weight percent.

3. A method according to claim 1, wherein the composition further comprises the alcohol and the alcohol comprises an aliphatic monohydric alcohol.

4. A method according to claim 2, wherein the polypropylene glycol has a number average molecular weight of from about 600 to about 1200, the polyethylene glycol ester has a number average molecular weight of from about 200 to about 1450.

* * * * *